United States Patent
Imfeld et al.

(10) Patent No.: US 10,221,769 B2
(45) Date of Patent: Mar. 5, 2019

(54) SYSTEM AND APPARATUS FOR GAS TURBINE COMBUSTOR INNER CAP AND EXTENDED RESONATING TUBES

(71) Applicant: General Electric Company, Schenectady, NY (US)

(72) Inventors: Jost Imfeld, Scherz (CH); Andre Theuer, Baden (CH); Bruno Schuermans, La Tour de Peilz (CH); Naresh Kumar Aluri, Ennetturgi (CH)

(73) Assignee: General Electric Company, Schenectady, NY (US)

( * ) Notice: Subject to any disclaimer, the term of this patent is extended or adjusted under 35 U.S.C. 154(b) by 29 days.

(21) Appl. No.: 15/367,274

(22) Filed: Dec. 2, 2016

(65) Prior Publication Data
US 2018/0156128 A1    Jun. 7, 2018

(51) Int. Cl.
*F23R 3/42*  (2006.01)
*F02C 7/24*  (2006.01)
(Continued)

(52) U.S. Cl.
CPC .................. *F02C 7/24* (2013.01); *F02C 3/04* (2013.01); *F02C 7/18* (2013.01); *F23R 3/002* (2013.01);
(Continued)

(58) Field of Classification Search
CPC .. F23R 2900/00014; F23R 3/002; F23R 3/16; F05D 2260/96; F05D 2260/963; F05D 2270/14
See application file for complete search history.

(56) References Cited

U.S. PATENT DOCUMENTS

| 3,791,692 A | 2/1974 | Piere |
| 4,628,689 A | 12/1986 | Jourdan |

(Continued)

FOREIGN PATENT DOCUMENTS

| DE | 19603979 A1 | 8/1997 |
| DE | 10 2013 213 860 A1 | 1/2015 |

(Continued)

OTHER PUBLICATIONS

U.S. Appl. No. 15/367,245, filed Dec. 2, 2016.
(Continued)

*Primary Examiner* — Steven M Sutherland
(74) *Attorney, Agent, or Firm* — Charlotte C. Wilson; Ernest G. Cusick; Frank A. Landgraff

(57) ABSTRACT

A damping system and apparatus are disclosed for dampening acoustic pressure oscillations of a gas flow in a combustor of a gas turbine engine having at least one combustor with a combustor liner. A second inner cap portion is disposed on the at least one combustor. The second inner cap portion can have a hot surface, a cold surface, at least one burner opening protruding from the cold surface, and at least one neck ring having an internal opening and protruding from the cold surface. At least one extended resonating tube having a resonating tube neck is integrated with and protruding from the at least one neck ring. The at least one extended resonating tube is disposed between adjacent burner openings, and is configured such that the radial dimension is less than the axial dimension.

16 Claims, 13 Drawing Sheets

(51) Int. Cl.
*F23R 3/00* (2006.01)
*F02C 3/04* (2006.01)
*F02C 7/18* (2006.01)

(52) U.S. Cl.
CPC ............ *F23R 3/42* (2013.01); *F05D 2220/32* (2013.01); *F05D 2240/35* (2013.01); *F05D 2260/96* (2013.01); *F23R 2900/00014* (2013.01)

(56) References Cited

U.S. PATENT DOCUMENTS

| | | | |
|---|---|---|---|
| 5,290,973 | A | 3/1994 | Kwoh |
| 5,478,207 | A | 12/1995 | Stec |
| 5,522,705 | A | 6/1996 | Elaini et al. |
| 5,599,165 | A | 2/1997 | Elaini et al. |
| 5,812,496 | A | 9/1998 | Peck |
| 5,953,414 | A | 9/1999 | Abraham et al. |
| 6,413,050 | B1 | 7/2002 | Shimovetz |
| 6,581,722 | B2 | 6/2003 | Faulhaber et al. |
| 6,682,219 | B2 | 1/2004 | Alam et al. |
| 6,802,405 | B2 | 10/2004 | Barcock et al. |
| 6,917,200 | B2 | 7/2005 | Dronbnitzky |
| 7,291,946 | B2 | 11/2007 | Clouse et al. |
| 7,331,182 | B2 * | 2/2008 | Graf ............... F23R 3/002 181/213 |
| 7,357,220 | B2 | 4/2008 | Horikou |
| 7,413,808 | B2 | 8/2008 | Burd et al. |
| 7,832,211 | B2 * | 11/2010 | Ikeda ............... F23R 3/04 431/114 |
| 7,841,368 | B2 | 11/2010 | McMasters et al. |
| 7,931,117 | B2 | 4/2011 | Payot et al. |
| 8,167,091 | B2 | 5/2012 | Alecu et al. |
| 8,171,734 | B2 | 5/2012 | McMasters et al. |
| 8,210,211 | B2 | 7/2012 | McMasters et al. |
| 8,216,687 | B2 | 7/2012 | Burd et al. |
| 8,336,313 | B2 | 12/2012 | McMasters et al. |
| 8,469,141 | B2 | 6/2013 | Wang et al. |
| 8,499,893 | B2 | 8/2013 | Alecu et al. |
| 8,657,067 | B1 | 2/2014 | Mathur |
| 8,684,130 | B1 | 4/2014 | Bothien et al. |
| 8,720,204 | B2 | 5/2014 | Schlip et al. |
| 8,733,496 | B2 | 5/2014 | Ono et al. |
| 8,789,372 | B2 * | 7/2014 | Johnson ............... F23R 3/28 60/725 |
| 8,943,825 | B2 | 2/2015 | Magni et al. |
| 8,973,365 | B2 * | 3/2015 | Corr ............... F23R 3/002 181/207 |
| 8,978,250 | B2 | 3/2015 | Barcock et al. |
| 9,253,870 | B2 | 2/2016 | Willmot et al. |
| 9,309,809 | B2 | 4/2016 | Johnson et al. |
| 9,316,156 | B2 | 4/2016 | Matsuyama et al. |
| 9,334,804 | B2 | 5/2016 | Bothien et al. |
| 9,429,042 | B2 | 8/2016 | Genin et al. |
| 2002/0100281 | A1 | 8/2002 | Hellat et al. |
| 2003/0217556 | A1 | 11/2003 | Wiebe |
| 2004/0126247 | A1 | 7/2004 | Broser et al. |
| 2007/0012530 | A1 | 1/2007 | Garcia |
| 2007/0141375 | A1 | 6/2007 | Budinger et al. |
| 2007/0181362 | A1 | 8/2007 | Champney et al. |
| 2009/0255602 | A1 | 10/2009 | McMasters et al. |
| 2011/0308654 | A1 * | 12/2011 | Bothien ............... F23M 99/005 138/31 |
| 2014/0096537 | A1 | 4/2014 | McMahon |
| 2014/0150435 | A1 | 6/2014 | Maurer et al. |
| 2014/0212317 | A1 | 7/2014 | Garry |
| 2014/0241871 | A1 | 8/2014 | Gregory et al. |
| 2014/0345284 | A1 | 11/2014 | Bothien et al. |
| 2015/0047357 | A1 | 2/2015 | Schuermans et al. |
| 2015/0075168 | A1 | 3/2015 | De Jonge et al. |
| 2015/0113990 | A1 | 4/2015 | Eroglu |
| 2015/0113991 | A1 | 4/2015 | Tonon et al. |
| 2015/0113992 | A1 | 4/2015 | Tonon et al. |
| 2015/0241064 | A1 | 8/2015 | Boardman et al. |
| 2015/0315972 | A1 | 11/2015 | Lumbab et al. |
| 2015/0342022 | A1 | 11/2015 | Willmot et al. |
| 2015/0377487 | A1 | 12/2015 | Tonon et al. |
| 2016/0003162 | A1 * | 1/2016 | Beck ............... F23R 3/002 60/725 |
| 2016/0013652 | A1 | 1/2016 | Li et al. |
| 2016/0056578 | A1 | 2/2016 | Taylor |
| 2016/0057873 | A1 | 2/2016 | Richardson et al. |
| 2016/0069213 | A1 | 3/2016 | Fitt et al. |
| 2016/0072210 | A1 | 3/2016 | Armstrong et al. |
| 2016/0169513 | A1 | 6/2016 | Sobol et al. |
| 2016/0221115 | A1 | 8/2016 | Loeffel et al. |
| 2016/0334102 | A1 * | 11/2016 | Johnson ............... F23R 3/002 |
| 2018/0156461 | A1 | 6/2018 | Theuer et al. |

FOREIGN PATENT DOCUMENTS

| | | |
|---|---|---|
| GB | 2452476 | 11/2009 |
| JP | 2003214300 A | 7/2003 |
| WO | WO2008050028 A2 | 5/2008 |
| WO | WO2008050028 A3 | 8/2008 |
| WO | WO2009126403 A2 | 10/2009 |
| WO | WO2009148680 A2 | 12/2009 |
| WO | 2010/115980 A2 | 10/2010 |
| WO | WO2013169788 A2 | 11/2013 |
| WO | WO2013169788 A3 | 11/2013 |
| WO | WO2015023733 A1 | 2/2015 |
| WO | WO2015185320 A1 | 12/2015 |

OTHER PUBLICATIONS

Extended European Search Report and Opinion issued in connection with corresponding EP Application No. 17203861.4 dated Apr. 18, 2018.

* cited by examiner

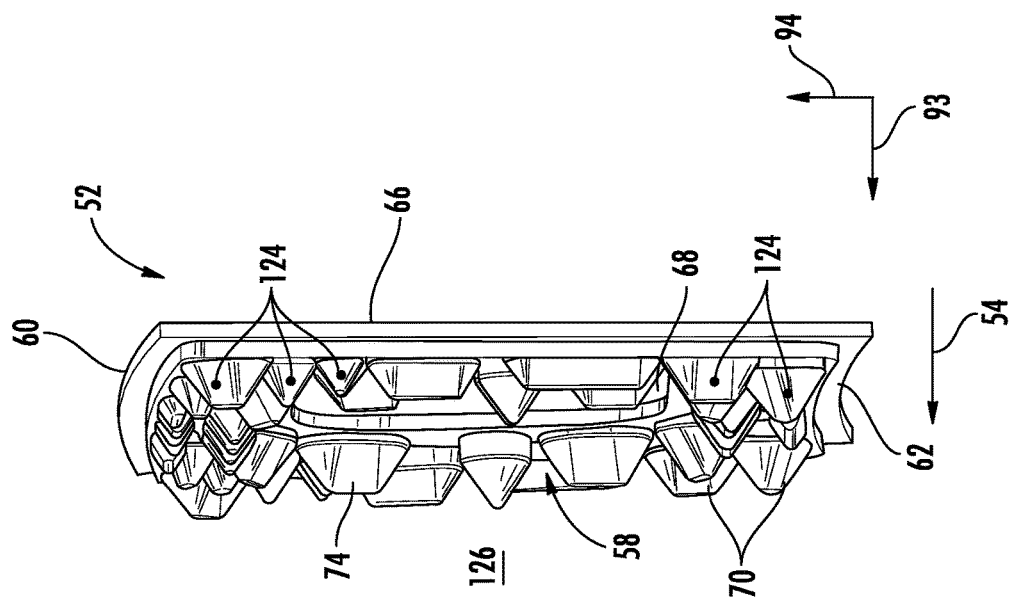
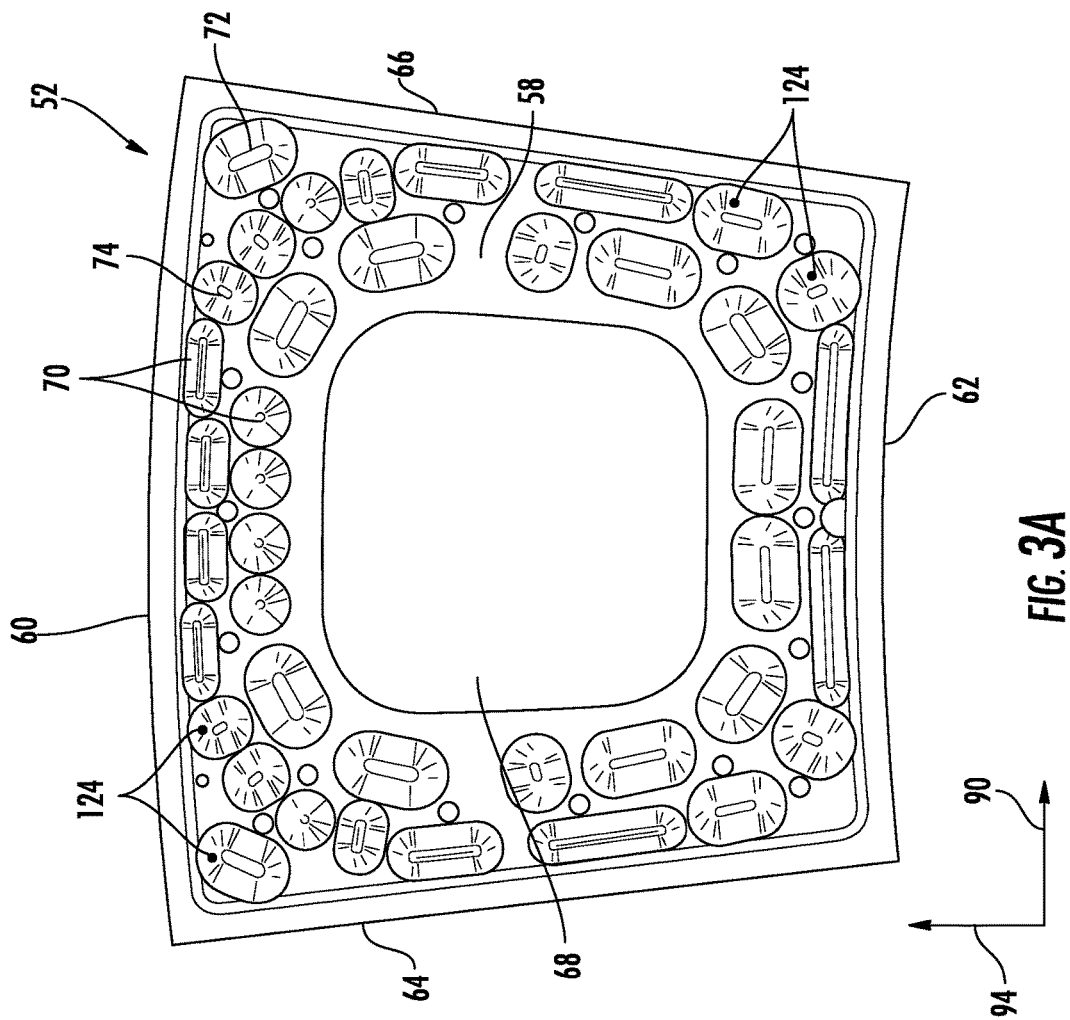

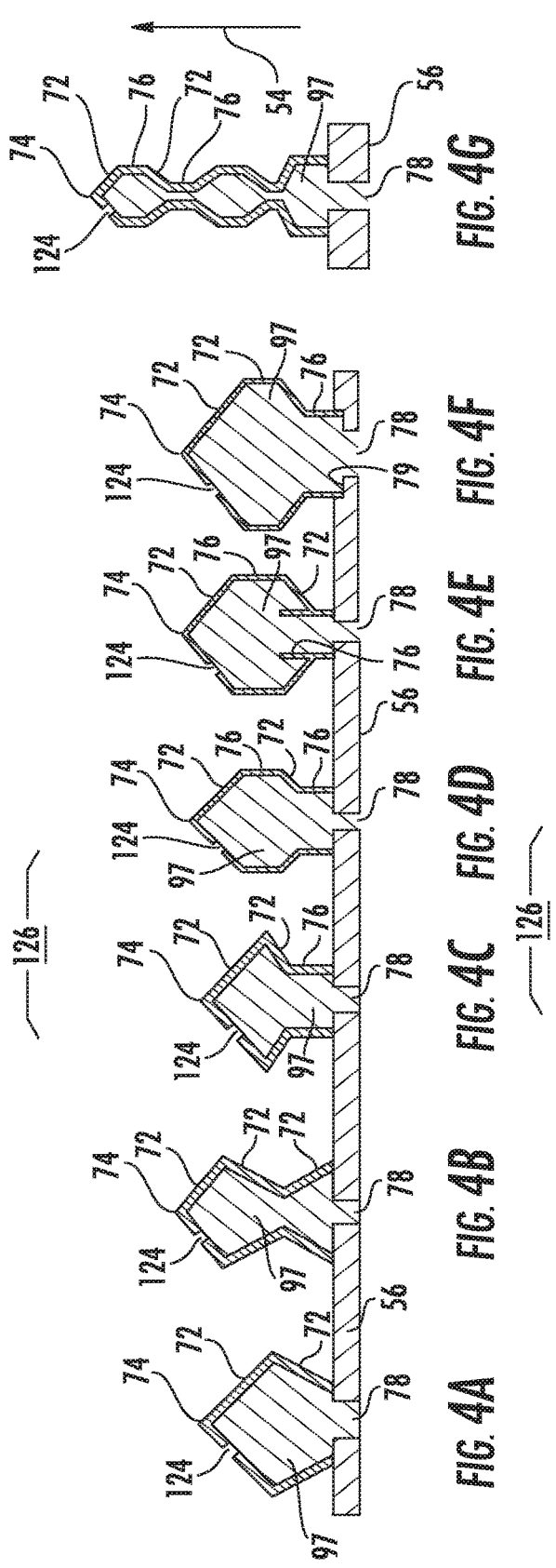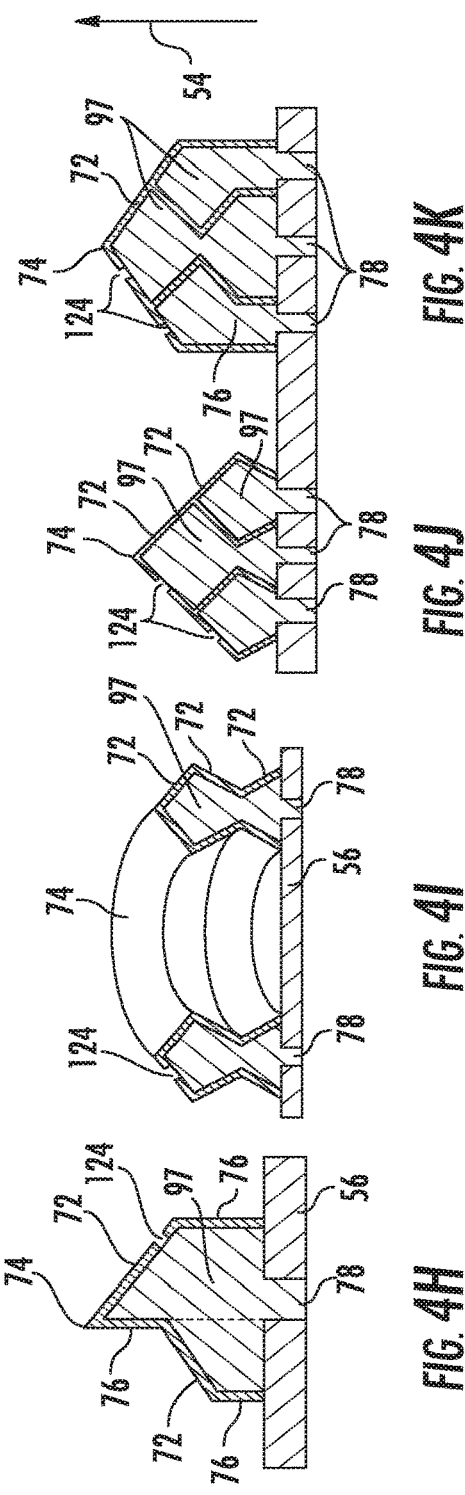

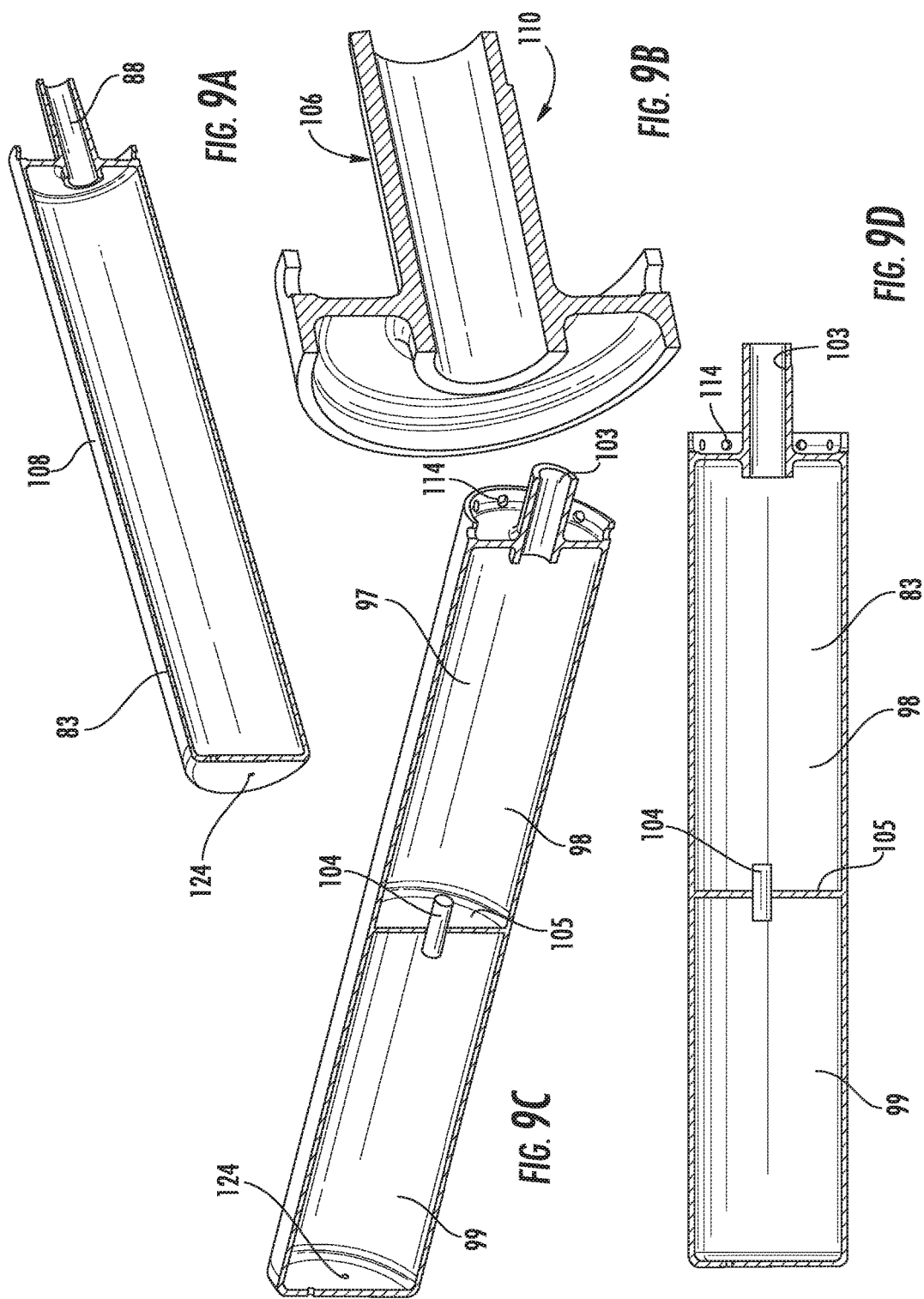

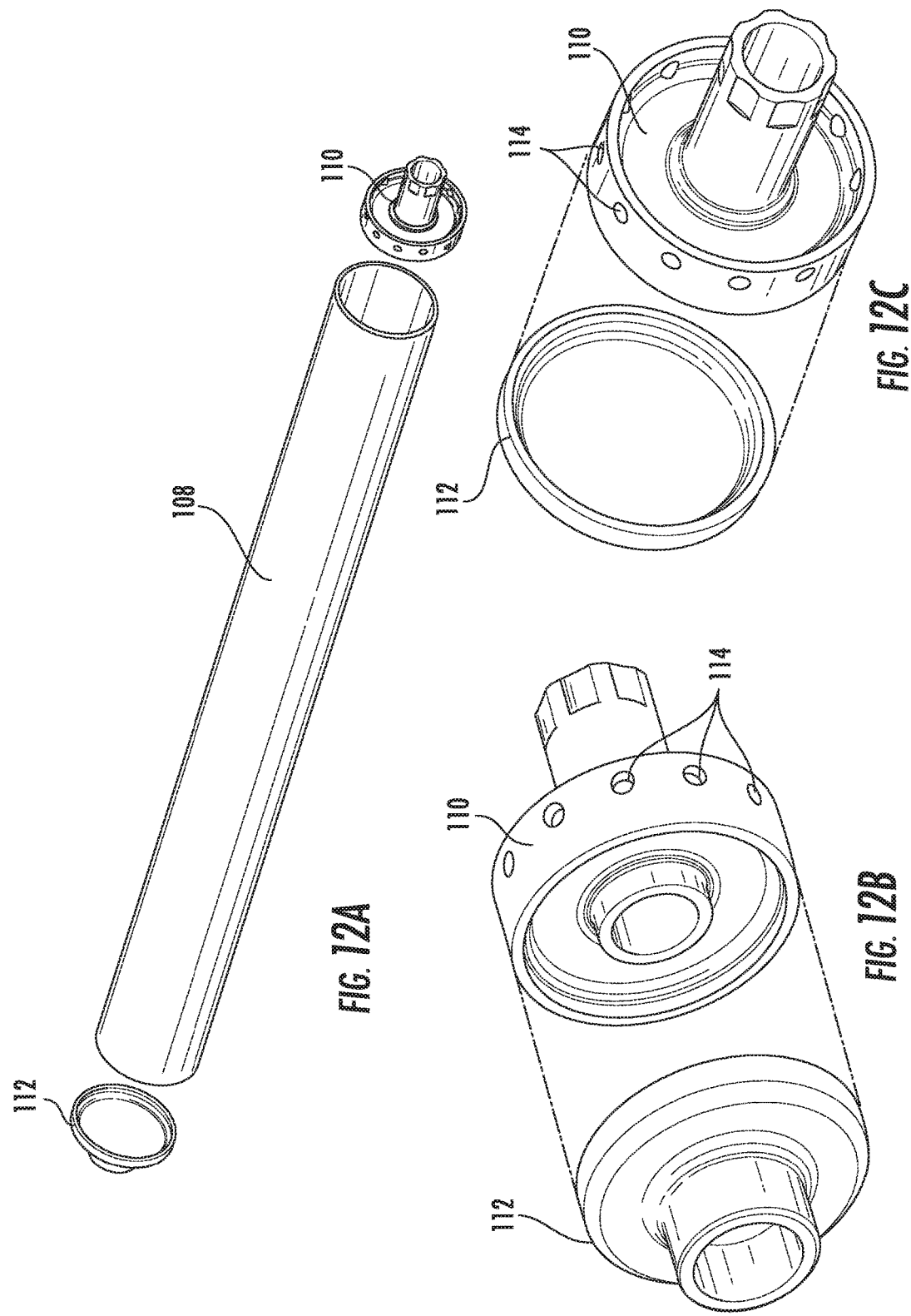

SYSTEM AND APPARATUS FOR GAS TURBINE COMBUSTOR INNER CAP AND EXTENDED RESONATING TUBES

FIELD OF THE DISCLOSURE

The disclosure relates generally to gas turbines, and more specifically, to systems and apparatus for making gas turbine combustor inner caps with extended resonating tubes for acoustic damping that mitigates combustion dynamic pressure pulses.

BACKGROUND OF THE DISCLOSURE

Destructive acoustic pressure oscillations, or pressure pulses, may be generated in combustors of gas turbine engines as a consequence of normal operating conditions depending on fuel-air stoichiometry, total mass flow, and other operating conditions. The current trend in gas turbine combustor design towards low emissions required to meet federal and local air pollution standards has resulted in the use of lean premixed combustion systems in which fuel and air are mixed homogeneously upstream of the flame reaction region. The fuel-air ratio or the equivalence ratio at which these combustion systems operate are much "leaner" compared to more conventional combustors in order to maintain low flame temperatures which in turn limits production of unwanted gaseous NOx emissions to acceptable levels. Although this method of achieving low emissions without the use of water or steam injection is widely used, the combustion instability associated with operation at low equivalence ratio also tends to create unacceptably high dynamic pressure oscillations in the combustor which can result in hardware damage and other operational problems. A change in the resonating frequency of undesired acoustics are also a result of the pressure oscillations. While current devices in the art aim to eliminate, prevent, or reduce dynamic pressure oscillations, the current devices fail to address both high frequency and low frequency damping devices integrated at specific locations on the inner cap, also referred to as combustor front panel.

Combustion acoustics in gas turbine engines can occur over a range of frequencies. Typical frequencies are less than 1000 Hz. However under certain conditions high acoustic amplitudes for frequencies in the 1000 to 10,000 Hz range are possible. Both low and high frequency acoustic modes can cause rapid failure of combustor hardware due to high cycle fatigue. The increase in energy release density and rapid mixing of reactants to minimize NOx emissions in advanced gas turbine combustors enhance the possibility of high frequency acoustics.

Additive manufacturing technologies can be used for making combustor inner caps, acoustic dampers, and other gas turbine structures, including technologies such as binder jetting, directed energy deposition, material extrusion, material jetting, powder bed fusion, sheet lamination, and vat photo-polymerization. Specifically, metallic parts can be additively manufactured using, for instance, selective laser melting, selective electron beam melting processes, and direct metal laser melting (DMLM). In these processes, layers of metallic powder are disposed. A laser beam or electron beam is directed onto the bed of metallic powder, locally melting the powder, and the beam is subsequently advanced on the powder surface. Molten metallic substance solidifies, while the metallic powder at a neighboring location is molten. Thus, a layer of solidified metal is generated along the beam trajectory. After a processing cycle in a layer of material is finished, a new layer of metal powder is disposed on top, and a new cycle of melting and subsequently solidifying the metal is carried out. In choosing the layer thickness and the beam power appropriately, each layer of solidified material is bonded to the preceding layer. Thus, a metallic component is built along a build direction of the manufacturing process. The thickness of one layer of material is typically in a range from 10 to 100 micrometers. The process advance or build direction from one layer to a subsequent layer typically is from bottom to top in a geodetic sense.

Limitations can also apply to these methods. For instance, if an overhang structure is manufactured in one layer, the overhang structure will bend without support for any new layer of applied solidified material. As a result, a weak product quality may be found, or the manufacturing process might be canceled. While a remedy for this situation might be to manufacture support structures below overhang structures, and subsequently removing the support structures, it is obvious that an additional manufacturing step involving a removal process, in particular a cutting or chip removing process, will be required, requiring an additional process step, thus adding manufacturing time, and cost. Moreover, for certain geometries manufactured, it might not be possible or very difficult to access and remove the support structures.

BRIEF DESCRIPTION OF THE DISCLOSURE

Aspects and advantages of the disclosure will be set forth in part in the following description, or may be obvious from the description, or may be learned through practice of the disclosure.

In one embodiment, a damping system is disclosed for dampening acoustic pressure oscillations of a gas flow in a combustor of a gas turbine engine having at least one combustor with a combustor liner. A second inner cap portion is disposed on the at least one combustor. The second inner cap portion can have a hot surface, a cold surface, at least one burner opening protruding from the cold surface, and at least one neck ring having an internal opening and protruding from the cold surface. At least one extended resonating tube having a resonating tube neck is integrated with and protruding from the at least one neck ring. The at least one extended resonating tube is disposed between adjacent burner openings, and is configured such that the radial dimension is less than the axial dimension.

In another embodiment, a gas turbine engine is disclosed having a compressor section and at least one combustor having a combustor liner positioned downstream from the compressor. A turbine section is positioned downstream from the combustion section. A damping system is also disclosed for dampening acoustic pressure oscillations of a gas flow in a combustor of a gas turbine engine having at least one combustor with a combustor liner. A second inner cap portion is disposed on the at least one combustor. The second inner cap portion can have a hot surface, a cold surface, at least one burner opening protruding from the cold surface, and at least one neck ring having an internal opening and protruding from the cold surface. At least one extended resonating tube having a resonating tube neck is integrated with and protruding from the at least one neck ring. The at least one extended resonating tube is disposed between adjacent burner openings, and is configured such that the radial dimension is less than the axial dimension.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which:

FIGS. 3A and 3B show additional views of an embodiment of a first inner cap with high-frequency dampers;

FIGS. 4A-4K show various high-frequency damper embodiments;

FIGS. 9A-9B show views of a single damping volume in an extended embodiment and FIGS. 9C-9D show views of a double damping volume low-frequency damper;

FIGS. 12A-12C show views of portions of a tubular extended low-frequency damper embodiment;

Figure 1:
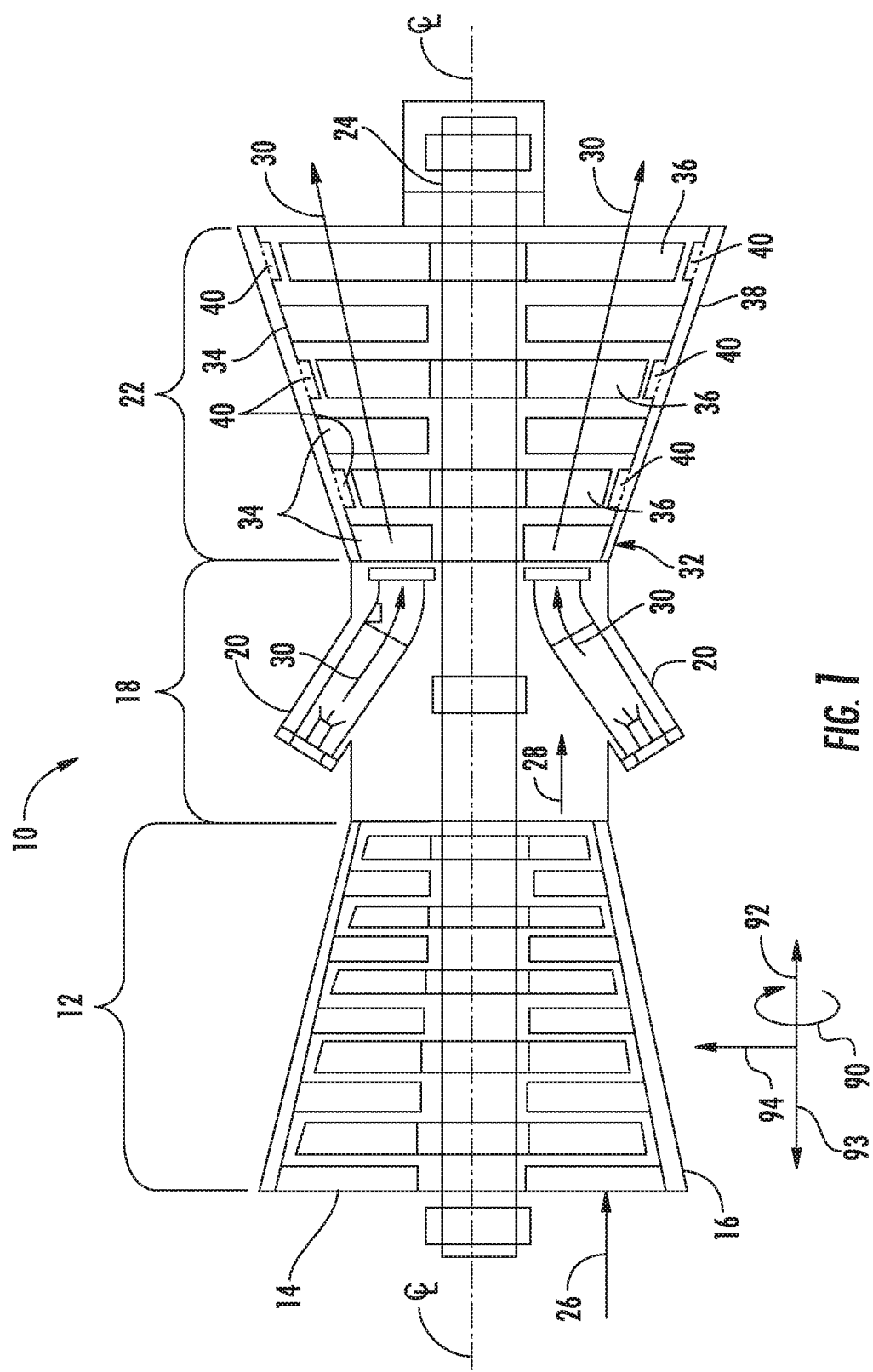
FIG. 1 is a schematic of a typical gas turbine having combustors suitable for having embodiments disclosed herein.
Figure 2A:
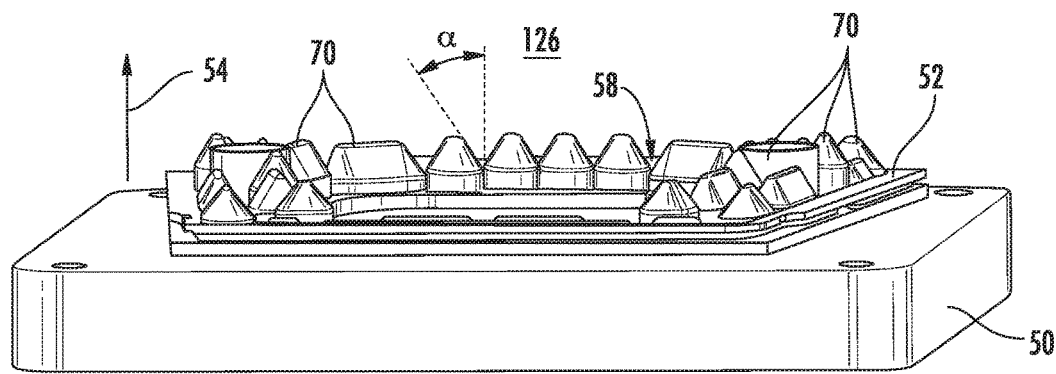
FIGS. 2A and 2B show views of an embodiment of a first inner cap with high-frequency dampers.
Figure 2B:
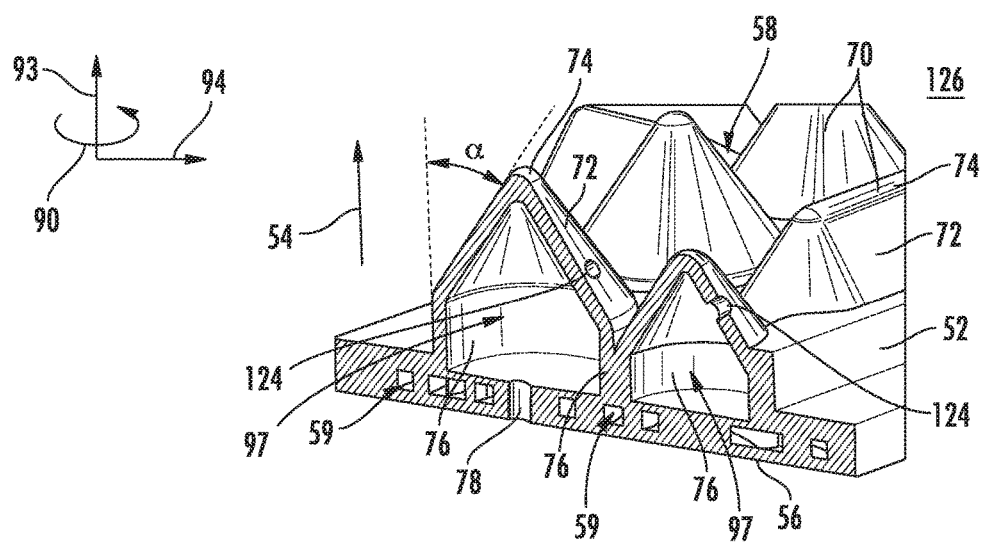
Figure 5A:
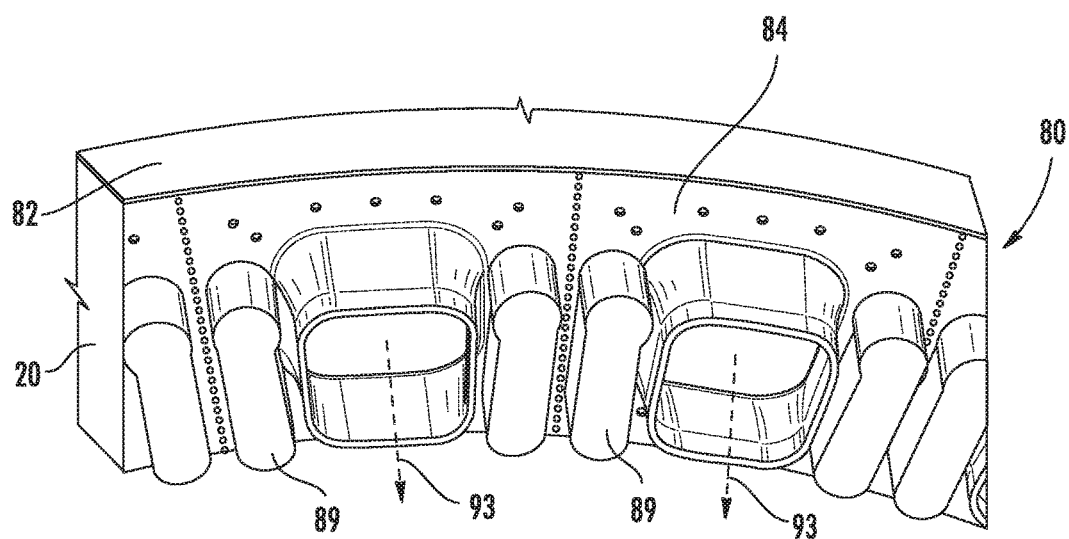
FIGS. 5A and 5B show views of damper embodiments attached to a second inner cap.
Figure 5B:
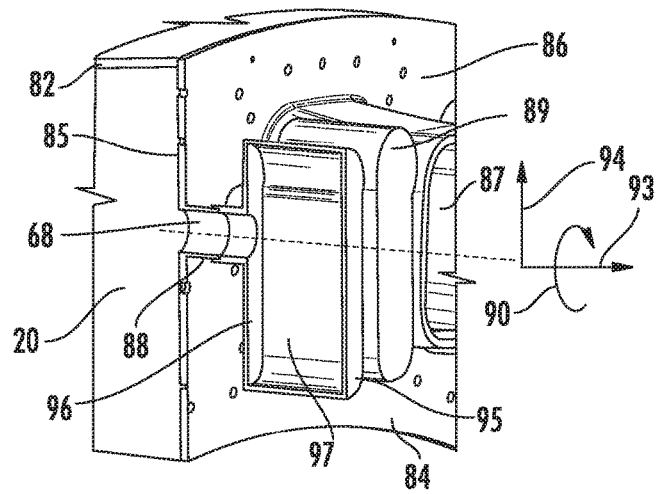
Figure 6A:
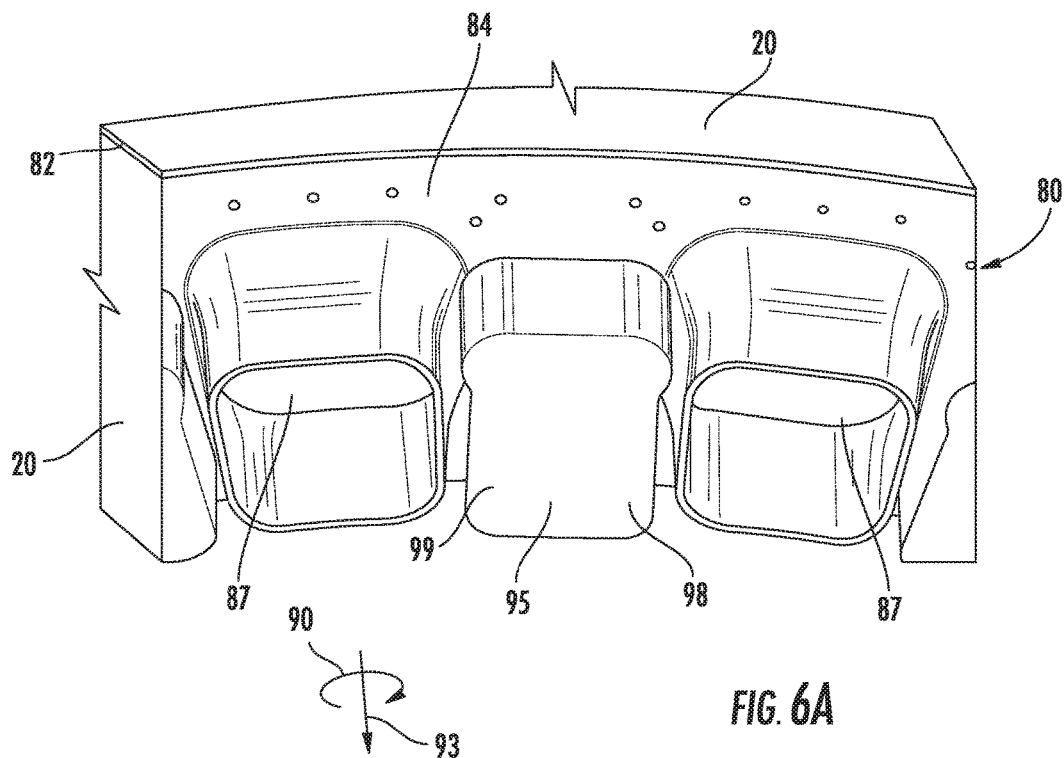
FIGS. 6A and 6B show views of another damper embodiment attached to a second inner cap.
Figure 6B:
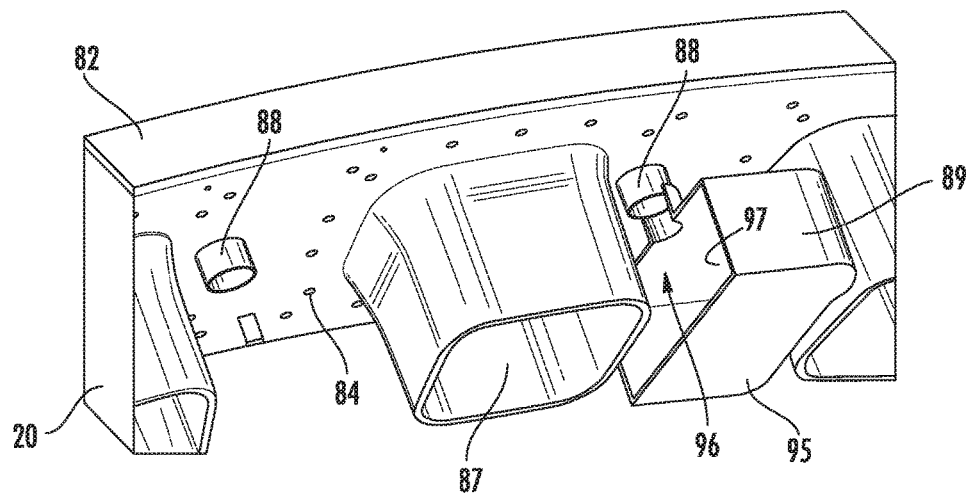
Figure 7:
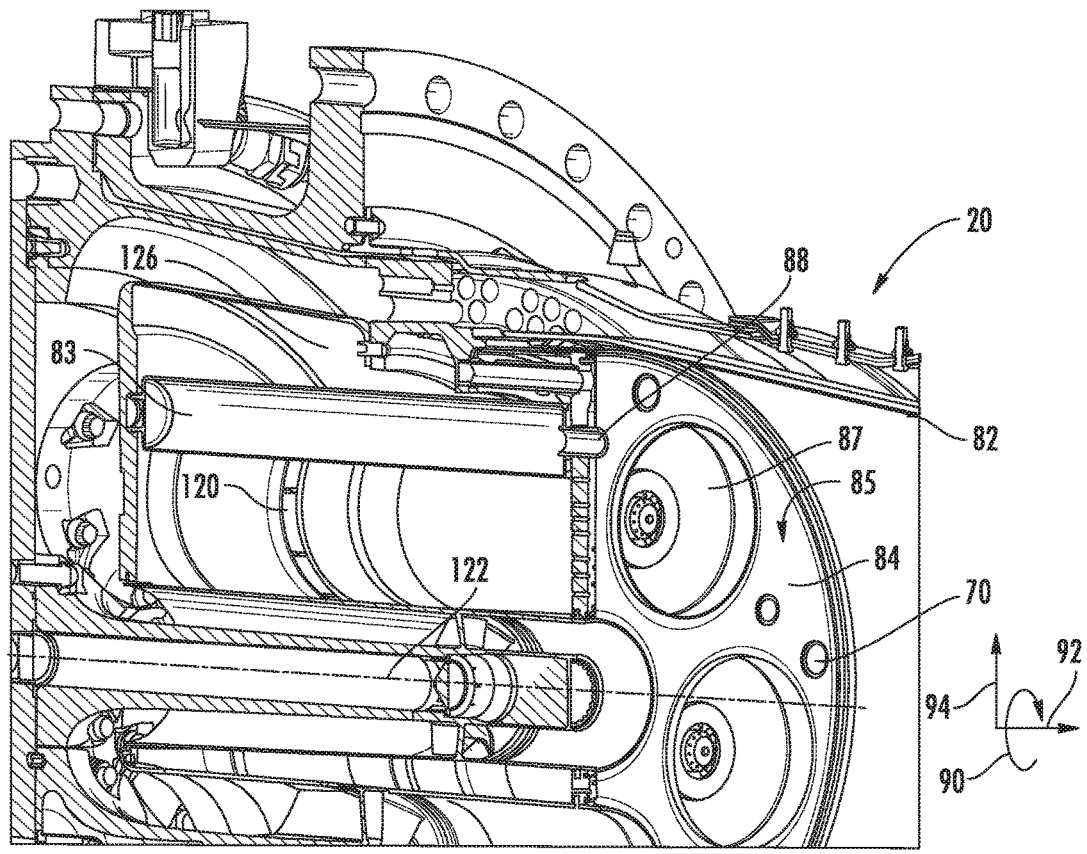
FIG. 7 is a perspective of a portion of a typical combustor suitable for having extended resonating tube embodiments disclosed herein.
Figure 8A:
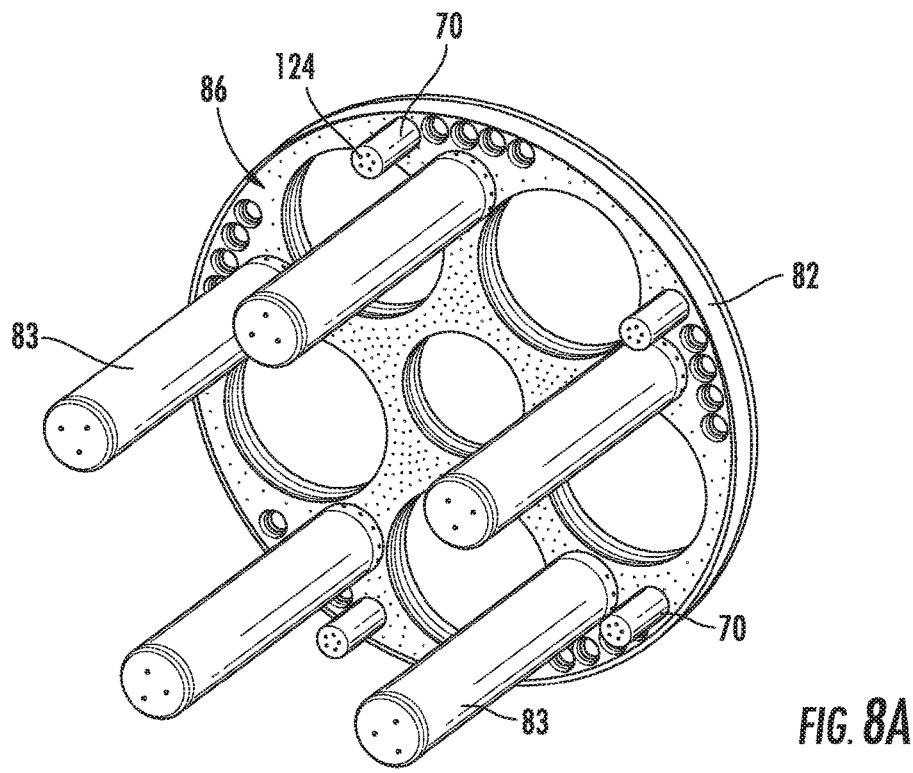
FIGS. 8A and 8B show views of a combined high and low frequency extended damper embodiment attached to a second inner cap.
Figure 8B:
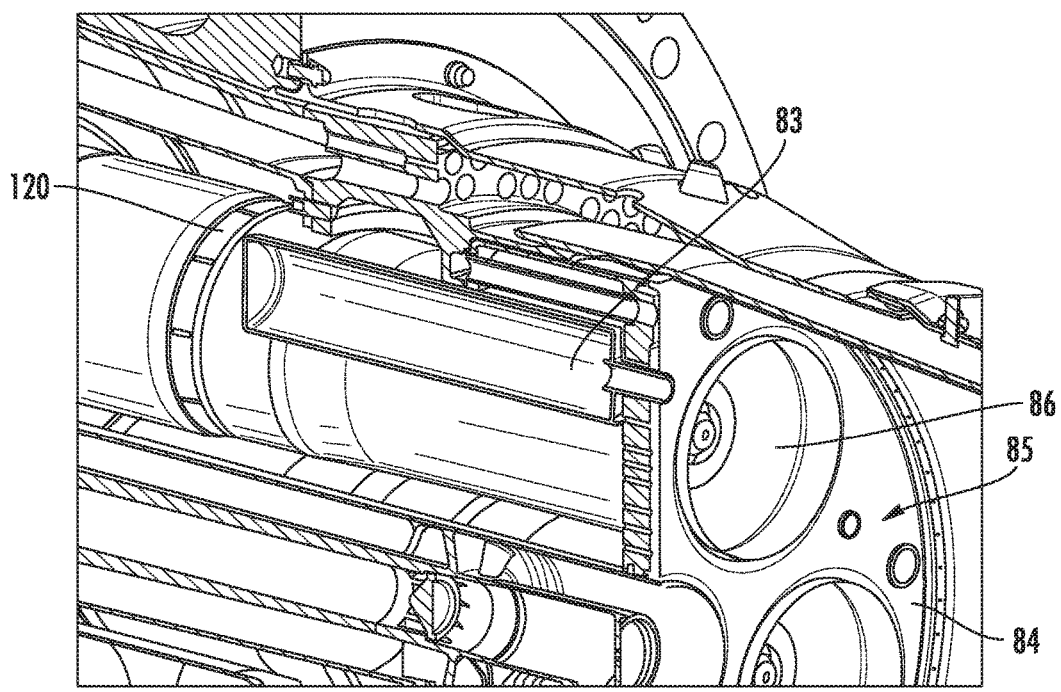

Repeat use of reference characters in the present specification and drawings is intended to represent the same or analogous features or elements of the present disclosure.

DETAILED DESCRIPTION OF THE DISCLOSURE

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component. The terms "high frequency" and "low frequency" are defined herein as; low frequency is less than or equal to 1000 Hz; high frequency is greater than 1000 Hz. When describing whether a certain stated frequency is "within approximately n (Hz)" of a certain value, it is meant that the stated value is within plus or minus approximately n, unless otherwise stated. "Target frequency" as used herein is meant to describe the range at which the combustor is meant to operate, or the frequency at which a dampening device is designed to be most effective (i.e., where the absorption coefficient is approximately 1, or 100%). "Resonating frequency" is meant to describe the actual frequency at which the combustor is operating, including times during which acoustic pressure oscillations are occurring.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an industrial gas turbine for purposes of illustration, one of ordinary skill in the art will readily appreciate that embodiments of the present invention may be applied to any turbomachine including but not limited to an aero-derivative turbine, marine gas turbine as well as an aero engine turbine, unless specifically recited in the claims.

In one embodiment, additive manufacturing generates a first inner cap 52 that avoids temporary supports, for overhang ledges 72 (inclined surfaces), which can stop the printing process. A first inner cap 52 with high frequency dampers 70 is disclosed that is compatible with the additive process such that the part orientation and upstream axial build direction 54 require no temporary supports during part manufacturing. Additionally, the high frequency dampers are shaped to avoid overhang ledges 72 and are distributed throughout the first inner cap to reduce the weight of cap by about 50%.

Referring now to the drawings, wherein like numerals refer to like components, FIG. 1 illustrates an example of a gas turbine 10 as may incorporate various embodiments of the present invention. Directional orientation, consistent in all figures, is defined as circumferential direction 90, downstream axial direction 92, upstream axial direction 93, and radial direction 94. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having at least one combustor 20 downstream from the compressor section 12, and a turbine section 22 downstream from the combustion section 18. As shown, the combustion section 18 may include a plurality of the combustors 20. A shaft 24 extends axially through the gas turbine 10.

In operation, air 26 is drawn into the inlet 14 of the compressor section 12 and is progressively compressed to provide a compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. A turbine casing 38 at least partially encases the rotor blades 36 and the turbine nozzles 34. Each or some of the rows of rotor blades 36 may be circumferentially surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition or in the alternative, the shaft 24 may be used to drive the compressor section 12 of the gas turbine.

In FIGS. 2A-3B, a direct metal laser melting (DMLM) process uses a metal powder disposed on a build platform 50 in consecutive layers. Between each disposal step the actual laser melting process takes place. A laser beam of appropriate power is directed onto the metal powder, and advanced on the surface of the metal powder, such that the metal powder is locally melted and subsequently re-solidified. By repeating the steps of disposing metal powder, melting, and re-solidifying, a first inner cap 52 is built. The process of disposing one layer above another advances along the upstream axial build direction 54 which may generally be referred to as base side to apex. The upstream axial build direction 54 is generally parallel with the upstream axial direction 93 for the combustor containing the first inner cap 52. Typically, the thickness of each layer is from about 10 to about 100 micrometers.

The first inner cap 52 is thus manufactured starting from a base side 56. In order to manufacture an overhang structure, the overhang structure is manufactured such that it is tilted against the upstream axial build direction 54 at an angle α less than or equal to 45 degrees. As previously mentioned, the upstream axial build direction 54 may typically be from base side to apex. In manufacturing an additional layer of the first inner cap 52, the cantilevered portion, determined by the layer thickness and angle α, is small enough to bear its own weight and the weight of powder disposed on top of it in subsequent build steps. With a typical thickness in a range from 10 to 100 micrometers, and a build angle α less than or equal to 45 degrees, the cantilevered portion will be less than about 145 micrometers. As a result, hip roof-type or pyramid-type overhang structures can be manufactured without support structures. The internal damping volume of each damper can be sized for specific acoustic damping frequencies.

As seen in FIGS. 3A and 3B, the first inner cap 52 comprises a base side 56, a bump side 58, an outer side 60, an inner side 62, and a first radial side 64 and an opposing second radial side 66. The base side 56 can have at least one cooling channel 59 integrated with the base side 56. A through opening 68 is provided in the first inner cap 52 to allow flow of hot gas or passage of other combustor components. An upstream axial build direction 54 of the manufacturing process is indicated. The bump side 58, also referred to as the cold side, is furnished with a multitude of high-frequency dampers 70. These high-frequency dampers 70 typically are projections on the bump side 58 serving as acoustic dampers.

The high-frequency dampers 70 can have a purge holes 124 that provide fluid communication between the combustor cooling chamber 126 and the damper chamber 97. In particular, the purge holes 124 can increase cooling, but in other embodiments the purge holes 124 may be absent to eliminate fluid communication. When present, the purge holes 124 provide an increased cooling effect because cooling air enters into the damper chamber 97 from the combustor cooling chamber 126 via the purge holes 124 and cools the damping volume inside the damper chamber 97. The cooled damping volume then flows out from the damper chamber 97 through the opening 68 into the combustion gases. These high-frequency dampers 70 are manufactured without support structures, and thus without need for subsequent cutting of the support structures during the additive manufacturing process. The high-frequency dampers 70 are generally hip-roof shaped, pyramid shaped, or polygonal shaped.

The high-frequency dampers 70 can have an apex 74 on the bump side 58 with overhang ledges 72 extending from the apex 74 boundaries. The overhang ledges 72 are tilted against upstream axial build direction 54 at an angle α of less than or equal to 45 degrees. The damper 70 can also include extension ledges 76 that extend generally parallel with the upstream axial build direction 54. Extension ledges 76 can extend from overhang ledges 72 or the bump side 58. Extension ledges 76 and overhang ledges 72 can extend any distance thereby adjusting the damping volume inside the high-frequency dampers 70. Generally, an overhang ledge 72 comprises a ledge surface extending at an angle α from parallel with the upstream axial build direction 54, while the extension ledge 76 comprises a ledge surface extending generally parallel with upstream axial build direction 54. Purge holes 124 can be disposed on any overhang ledge 72 or extension ledge 76. The base side 56 can have at least one acoustic port 78 allowing fluid communication between the internal damping volume of the high-frequency dampers 70 and combustion gases in the combustor 20. Acoustic ports 78 generally penetrate the base side 56 and are open to the internal damping volume of the high-frequency dampers 70 to allow passage of destructive acoustic pressure oscillations from the combustor 20 into the damper 70. A plurality of acoustic ports 78 can serve each damper 70. The acoustic ports 78 can be sized frequency specific to allow passage of the most damaging acoustic pressure oscillations into the damper 70.

Exemplary configurations of high-frequency dampers 70 as may be producible by the method disclosed herein are shown in FIGS. 4A through 4K. FIG. 4A shows two stacked alternating angle overhang ledges 72 extending from the base side 56 to the apex 74. FIG. 4B shows three stacked alternating angle overhang ledges 72 extending from the base side 56 to the apex 74. FIG. 4C shows an extension ledge 76 extending from the base side 56 with two stacked alternating angle overhang ledges 72 further extending to the apex 74. FIG. 4D shows an extension ledge 76 extending from the base side 56 to an overhang ledge 72 further extending to another extension ledge 76 and then another overhang ledge 72 terminating at the apex 74. FIG. 4E shows a configuration with lengthened extension ledges 76 positioned at the acoustic port 78 perimeter boundary. The lengthened extension ledges 76 are used to optimize the damper efficiency. FIG. 4F shows a base side cutout 79 configuration that shortens the acoustic port 78 for optimizing damper efficiency. FIG. 4G shows three stacked polygonal shapes interconnected with extension ledges 76. FIG. 4H shows a mixture of various lengths of extension ledges 76 and overhang ledges 74 extending from the base side 56 to the apex 74. FIG. 4I shows an annular interconnection of FIG. 4B shaped dampers with multiple acoustic ports 78. FIG. 4J shows a central portion FIG. 4B shaped damper surrounded by an outer annularly interconnected portion of FIG. 4A shaped dampers with multiple acoustic ports 78, each portion having separate acoustic ports 78. FIG. 4K shows a central portion FIG. 4B shaped damper surrounded by an outer annular interconnection of extension ledges 76 topped with overhang ledges 72, each portion having separate acoustic ports 78. It will become immediately clear to the skilled person how the embodiments shown in FIGS. 4A through 4K are producible by a method as disclosed herein as part of the first inner cap 52 as shown in FIG. 1A through 2B.

Another embodiment can have low frequency dampers (LFD) 89, also known as resonating tubes, as shown in FIGS. 5A-6B, that can be welded to specially prepared neck rings 88 of the second inner cap 84. Welds are placed inside neck rings 88 with the LFD's 89 being located at positions to effectively attack various frequencies of pulsation. Two separate LFD 89 volumes can be welded to each second inner cap 84, each LFD volume having a target volume that fits between burner openings 87 and allows easier welding procedure for installation. Many configurations of the LFD's 89 are presented herein. The location of LFD's 89 simplifies the assembly process wherein the LFD 89 welded structure is joined to the back surface of second inner cap 84 with no sealing necessary between the cold surface 86 and hot surface 85 thus making the LFD 89 independent from thermal movements between hot and cold surfaces 85, 86.

The embodiment, as shown in FIGS. 5A-6B, can have a damping system 80 for dampening acoustic pressure oscillations of a gas flow in a combustor 20 of a gas turbine engine 10 with at least one combustor 20 with a combustor liner 82. A second inner cap 84 portion is disposed on the at least one combustor 20 and can have a hot surface 85, a cold surface 86, at least one burner opening 87 protruding from the cold surface 86, at least one neck ring 88, having an internal opening 68, protruding from the cold surface 86, and at least one extended resonating tube 89 integrated with and protruding from the at least one neck ring 88. The burner openings 87 can be shaped to match any burner profile including annular, rectangular, or irregular shaped burners. The at least one extended resonating tube 89 is disposed between adjacent burner openings 87. The at least one extended resonating tube 89 is constructed such that the radial 94 dimension is greater than or equal to the upstream axial 93 dimension.

The damping system 80 with at least one extended resonating tube 89 can have a closed end 95, an open end 96 comprising a neck opening 68, and at least one damper chamber 97 therebetween, the at least one damper chamber 97 being in fluid communication, through the neck opening 68, with an interior of the at least one combustor 20. Also, at least one damper chamber 97 can have a first damping volume 98 in fluid communication with the neck opening 68 and a second damping volume 99 in fluid communication with the neck opening 68. The first damping volume 98 can be in fluid communication with the second damping volume 99. The first and second damping volumes 98, 99 can be approximately equal or different.

The damping system 80 can also be configured so that the second inner cap 84 portion is disposed as an annulus and aligned approximately perpendicular to the centerline of the combustor 20. Additionally, the damping system 80 extended resonating tube 89 opening 68 can be fixedly coupled to a respective at least one neck ring 88.

The damping system 80 extended resonating tube 89 can be configured to dampen acoustic pressure oscillations resonating at a target frequency less than or equal to about 1000 Hz. Additionally, the first and second damping volumes 98, 99 can be configured to dampen acoustic pressure oscillations resonating at two different target frequencies less than or equal to about 1000 Hz.

In another embodiment, LFD's, sometimes referred to as Helmholtz dampers, resonators or resonating tubes 89, can be attached to the second inner cap 84 of the combustor. Typically, a single neck ring 88 enters the combustion chamber 20 per LFD 89. This arrangement positions the extended resonating tube 89 at a very efficient location thereby providing the same damping performance with smaller LFD 89 volumes. The LFD's 89 can also be positioned in the space between the fuel injector swozzles 120 (swirler nozzle) that is typically not fully utilized thereby not affecting the overall architecture of the combustor 20. The LFD's 89 can also be field installed for conversion, modification and upgrades to existing turbines. Typical orientation of these LFD's 89 can be approximately parallel to the combustor 20 axis, or about +/-15 degrees from the combustor axis. The neck ring 88 can face the combustion chamber 20 on the hot surface 85 of the second inner cap 84.

The embodiments shown in FIGS. 7-13 disclose a damping system 80 for dampening acoustic pressure oscillations of a gas flow in a combustor 20 of a gas turbine 10 engine is disclosed that can have at least one combustor 20 comprising a combustor liner 82. A second inner cap 84 portion can be disposed on the at least one combustor 20, with the second inner cap 84 portion having a hot surface 85, a cold surface 86, and at least one burner opening 87 protruding from the cold surface 86. The burner openings 87 can be shaped to match any burner profile including annular, rectangular, or irregular shaped burners. At least one neck ring 88 having an internal opening can protrude from the cold surface 86. At least one extended resonating tube 83 can have a resonating tube neck, and can be integrated with and protruding from the at least one neck ring 88. The at least one extended resonating tube 83 can be disposed between adjacent burner openings 87. The at least one extended resonating tube 83 is configured such that the radial 94 dimension is less than the upstream axial 93 dimension. Also, the at least one extended resonating tube 83 can have a closed end 95, an open end 96, and at least one damper chamber 97 therebetween, the at least one damper chamber 97 being in fluid communication with an interior of the at least one combustor 20.

Figure 10A:
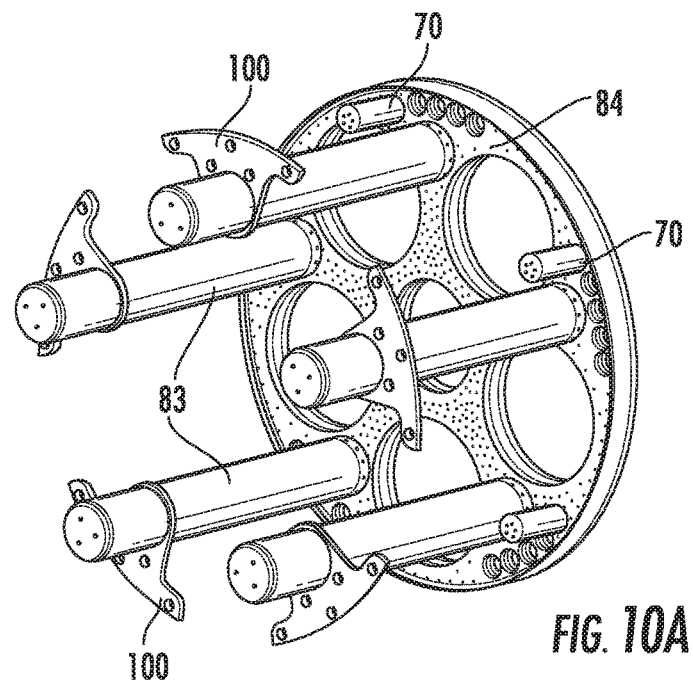
FIGS. 10A and 10B show views of another extended low frequency damper embodiment with alternative fixation.
Figure 10B:
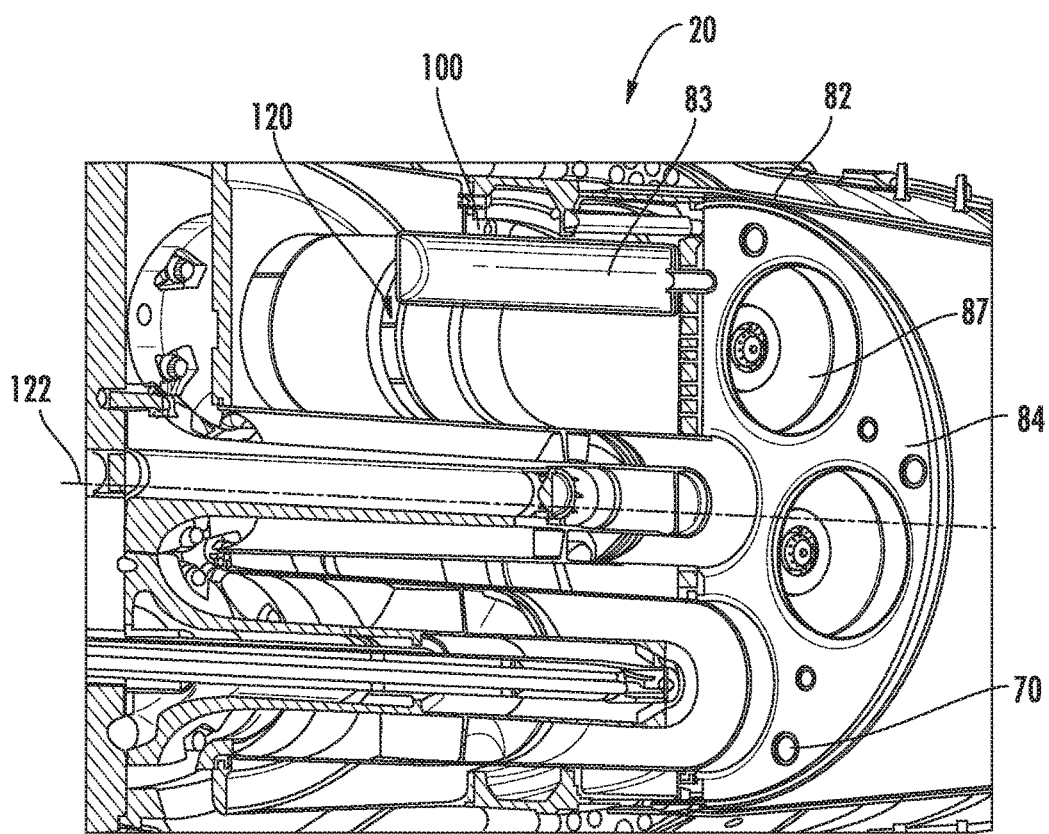
Figure 11A:
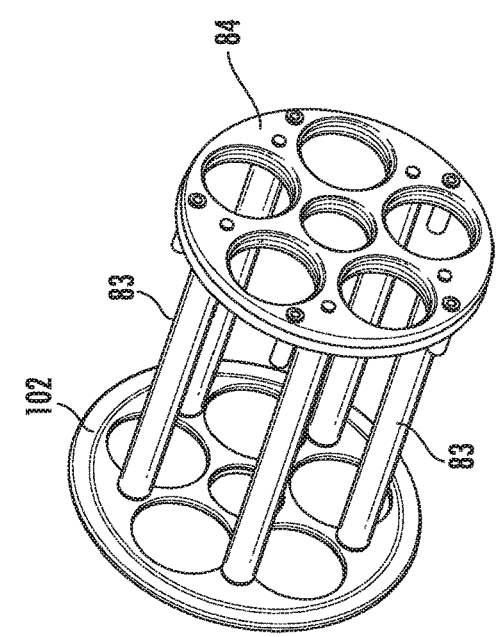
FIGS. 11A-11C show views of another extended low-frequency damper embodiment.
Figure 11B:
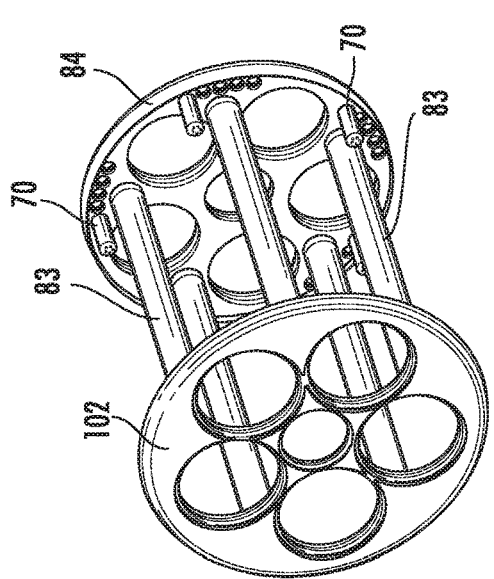
Figure 11C:
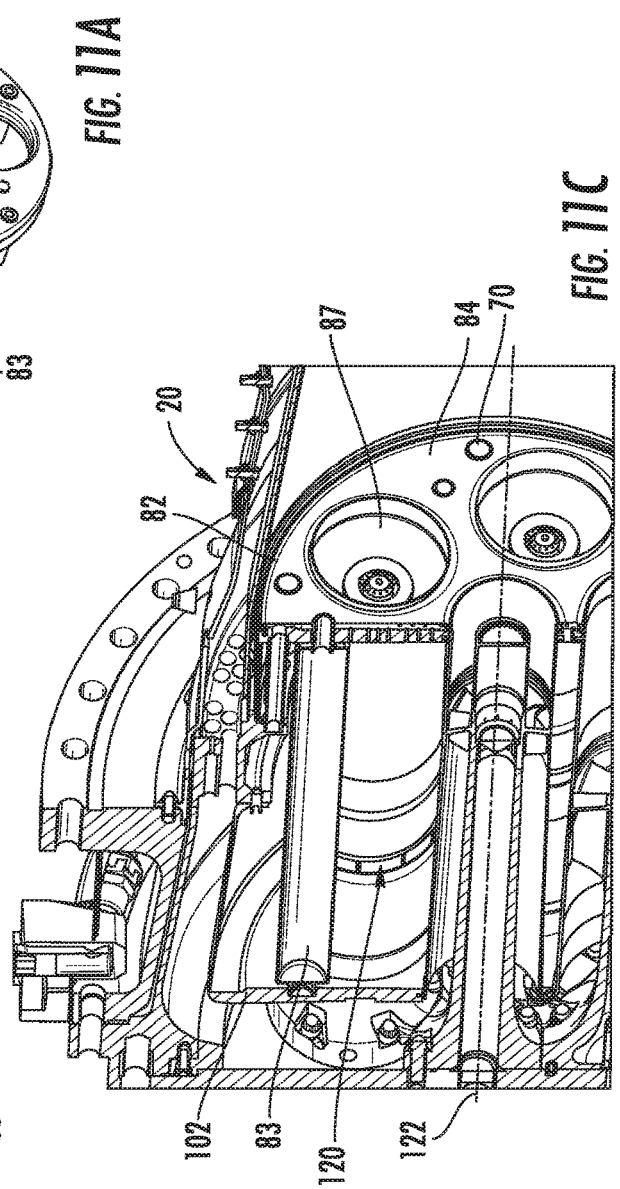

In FIGS. 10A and 10B, the extended resonating tube 83 can also have a support plate 100 disposed proximate the closed end 95 upstream of the second inner cap 84. The support plate 100 can be removably disposed to the combustor liner 82. In other embodiments shown in FIGS. 11A-11C, the extended resonating tube 83 can have a plena cover 102 disposed proximate the closed end 95 upstream of the second inner cap 84. The plena cover 102 can be disposed on the combustor liner 82.

FIGS. 9A-9B show views of a single damping volume embodiment and FIGS. 9C-9D show views of a double damping volume embodiment of an extended resonating tube 83. The extended resonating tube 83 can have a first damping volume 98 with a first neck portion 103 proximate the open end 96, coupled to a second damping volume 99 having a second neck portion 104 disposed in a separator 105 positioned about midway in the extended resonating tube 83. A flanged annulus 106 portion can at least partially surround the first neck portion 103. The flanged annulus 106 can also be coupled to the second inner cap 84.

Figure 13A:
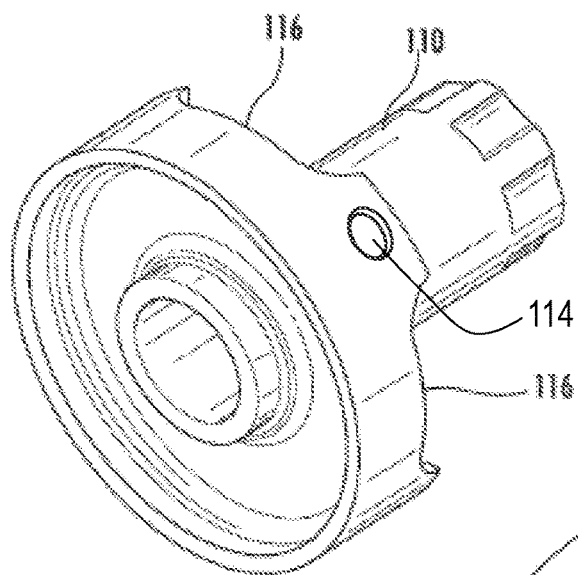
FIGS. 13A-13C show views of an extended damper open end cap embodiment.
Figure 13B:
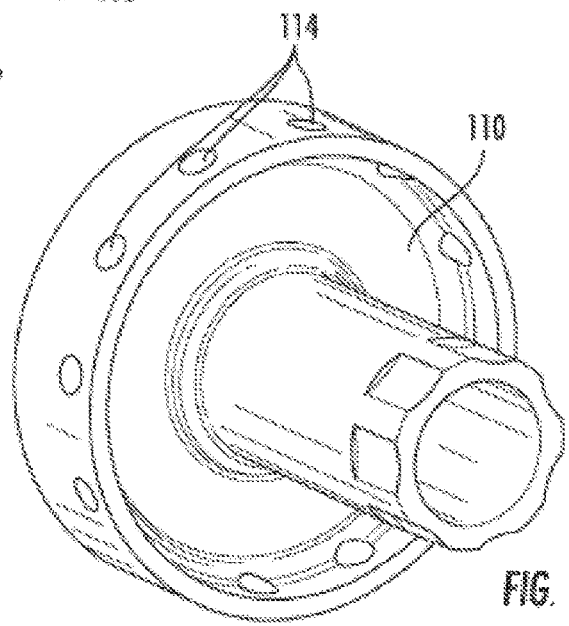
Figure 13C:
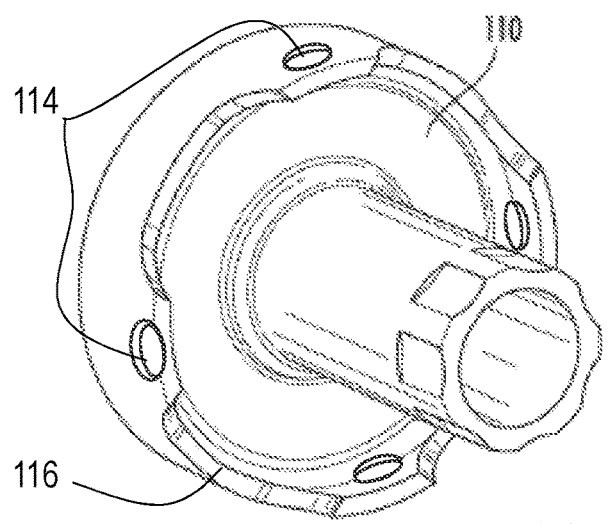

Additionally, as shown in FIGS. 12 and 13, the extended resonating tube 83 can have a tubular portion 108 with an open end cap 110 disposed proximate the open end 96, and a closed end cap 112 disposed proximate the close end 95. The open end cap 110 can have cooling air ports 114 configured as cut outs 116, cylindrical openings, and mixtures thereof.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A damping system for dampening acoustic pressure oscillations of a gas flow in a combustor of an engine, the damping system comprising:
   a combustor defining a centerline in an axial direction and comprising a combustor liner surrounding a combustion chamber and circumscribing the centerline, the combustor liner having a forward end and an aft end;
   a cap assembly disposed across the forward end of the combustor liner to define an upstream boundary of the combustion chamber, the cap assembly comprising:
      a plate having a hot surface and a cold surface;
      a plurality of burner openings defined through the plate and protruding upstream from the cold surface;
      at least one neck ring comprising an internal opening defined through the plate from the hot surface to the cold surface, the at least one neck ring protruding upstream from the cold surface between adjacent burner openings of the plurality of burner openings; and
      at least one extended resonating tube integrated with and protruding upstream from the at least one neck ring between the adjacent burner openings, the at least one extending resonating tube comprising a tubular portion, a closed end comprising a closed end cap, an open end comprising an open end cap and a resonating tube neck defining a neck opening through the open end cap, and at least one chamber between the closed end and the open end, the at least one chamber being in fluid communication, through the neck opening, with an interior of the combustor;
   wherein, in relation to the centerline of the combustor, the at least one extended resonating tube is configured such that a radial dimension of the at least one extended resonating tube is less than an axial dimension of the at least one extended resonating tube; and
   wherein the open end cap further comprises cooling air ports.

2. The damping system of claim 1, wherein the at least one extended resonating tube is in fluid communication, through at least one purge hole, with a combustor cooling chamber and further comprises a support plate disposed proximate the closed end upstream of the cap assembly, the support plate projecting radially from an outer surface of the at least one extended resonating tube.

3. The damping system of claim 2, wherein the support plate is removably coupled to a combustor casing.

4. The damping system of claim 1, wherein the at least one extended resonating tube further comprises a plena cover support disposed proximate the closed end cap upstream of the cap assembly.

5. The damping system of claim 4, wherein the plena cover support is coupled to a combustor casing.

6. The damping system of claim 1, wherein the at least one chamber of the at least one extended resonating tube comprises a first damping volume and a second damping volume; and wherein the first damping volume is proximate to the resonating tube neck at the open end cap, the second damping volume is proximate to the closed end cap, a separator separating the first damping volume from the second damping volume, a second neck portion extending through the separator and providing fluid communication between the first damping volume and the second damping volume, and a flanged annulus portion at least partially surrounding the resonating tube neck.

7. The damping system of claim 6, wherein the flanged annulus is coupled to the open end cap.

8. The damping system of claim 1, wherein the cooling air ports are configured as cut outs, cylindrical openings, and mixtures thereof.

9. An engine comprising:
   a compressor section;
   a combustion section positioned downstream from the compressor section, the combustion section comprising a combustor, the combustor defining a centerline in an axial direction and comprising a combustor liner surrounding a combustion chamber and circumscribing the centerline, the combustor liner having a forward end and an aft end;
   a turbine section positioned downstream from the aft end of the combustor liner of the combustion section;
   wherein the engine comprises a damping system for dampening acoustic pressure oscillations of a gas flow in the combustor, the damping system comprising:
   a cap assembly disposed radially across the forward end of the combustor to define an upstream boundary of the combustion chamber, the cap assembly comprising:
      a plate having a hot surface and a cold surface;
      a plurality of burner openings protruding upstream from the cold surface;
      at least one neck ring comprising an internal opening defined through the first plate from the hot surface to the cold surface, the at least one neck ring protruding upstream from the cold surface between adjacent burner openings of the plurality of burner openings; and
      at least one extended resonating tube integrated with and protruding upstream from the at least one neck ring between the adjacent burner openings, the at least one extending resonating tube comprising a tubular portion, a closed end comprising a closed end cap, an open end comprising an open end cap and a resonating tube neck defining a neck opening through the open end cap, and at least one chamber between the closed end and the open end, the at least one chamber being in fluid communication, through the neck opening, with an interior of the combustor;
   wherein the at least one extended resonating tube is configured such that, in relation to the centerline, a radial dimension is less than an axial dimension; and
   wherein the open end cap further comprises cooling air ports.

10. The engine of claim 9, wherein the at least one chamber is in fluid communication, through at least one purge hole, with a combustor cooling chamber, and wherein the extended resonating tube further comprises a support plate disposed proximate the closed end upstream of the cap assembly.

11. The engine of claim 10, wherein the support plate is removably coupled to the combustor casing.

12. The engine of claim 9, wherein the at least one extended resonating tube further comprises a plena cover support disposed proximate the closed end cap upstream of the cap assembly.

13. The engine of claim 12, wherein the plena cover support is coupled to the combustor casing.

14. The engine of claim 9, wherein the at least one chamber of the at least one extended resonating tube comprises a first damping volume and a second damping volume; and wherein the first damping volume is proximate to the resonating tube neck at the open end cap, the second damping volume is proximate to the closed end cap, a separator separating the first damping volume from the second damping volume, a second neck portion extending through the separator and providing fluid communication between the first damping volume and the second damping volume, and a flanged annulus portion at least partially surrounding the resonating tube neck.

15. The engine of claim 14, wherein the flanged annulus portion is coupled to the open end cap.

16. The engine of claim 9, wherein the cooling air ports are configured as cut outs, cylindrical openings, and mixtures thereof.

* * * * *